United States Patent

[11] 3,548,876

[72] Inventors: Taco Jan Viersma
Julianalaan 26, Pijnacker;
Petrus Blok, Coymanstraat 7, Moerkapelle, Netherlands
[21] Appl. No. 799,371
[22] Filed Feb. 14, 1969
[45] Patented Dec. 22, 1970
[32] Priority Feb. 19, 1968
[33] Netherlands
[31] No. 6802369

[54] CONTROL ARRANGEMENT
3 Claims, 3 Drawing Figs.
[52] U.S. Cl. .................................................. 137/625.62,
137/625.63, 137/82; 91/47, 91/51
[51] Int. Cl. ........................................................ F15b 13/02,
F16k 11/07
[50] Field of Search ........................................... 137/82-
—86, 625.6—.69; 91/47, 51

[56] References Cited
UNITED STATES PATENTS
3,266,515  8/1966  Phillips ........................ 137/85

*Primary Examiner*—Henry T. Klinksiek
*Attorney*—Frank R. Trifari

ABSTRACT: The invention relates to a control arrangement which is particularly suitable for use as a precontrol arrangement for a main control valve of a hydraulic servomotor and includes at least one duct one end of which can be connected through a flow restriction to a source of liquid of constant pressure and the other end of which is provided with at least one outlet aperture, a movable surface being arranged in front of said outlet aperture and determining the outflow resistance dependent on its position, which surface is displaceable by a command device responding to an input signal, the pressure in the duct section between the restriction and the outlet aperture serving as a control signal for the main control valve.

INVENTOR.
TACO JAN VIERSMA
PETRUS BLOK
BY
AGENT

CONTROL ARRANGEMENT

A control arrangement of the kind described above is known from the thesis by Dr. Ir. T. J. Viersma "Investigations into the accuracy of hydraulic servomotors," TH-Delft, 1961, page 81.

A drawback of the known arrangement is that in order to obtain a closed control system (precontrol arrangement, main control valve, servomotor) a measuring system is required which brings about a feedback between the output signal (actual position of the movable part of the servomotor) and the input signal (desired position of the movable part of the servomotor).

Furthermore, it is often desirable, for example, with numerical control to apply an input signal to a rotating motor. The output rotation of the motor must then be converted into a rectilinear movement of the movable surface.

In view of the required accuracy this substantially clearance-free conversion with the aid of mechanical means cannot be effected or can only be effected at very high cost.

An object of the invention is to provide an advantageous compact construction of a control arrangement as described hereinbefore in which the command device for controlling the movable surface may be formed by a rotating motor and in which only a very simple measuring system, if any, is required for the feedback.

To attain the envisaged object the control arrangement according to the invention is characterized in that it includes a rotatable threaded leadscrew which is coupled, possibly through a transmission, to an adjustable command device, for example, an electric motor, the outlet aperture being incorporated in a structural part which is longitudinally movable relative to the leadscrew, and in which the outlet aperture is substantially located on the outer diameter of the screw thread and cooperates with the end face thereof the movable structural part or the leadscrew being coupled to the movable part of the main control valve and/or of the servomotor.

In this control arrangement an input signal can be applied to the electric motor. Dependent on this signal the electric motor will rotate the leadscrew through a given angle. Due to this rotation the leadscrew will more or less release the outlet aperture(s). As a result the outflow resistance varies and the pressure in the duct section between restriction and outlet aperture will vary. Due to this variation in pressure the position of the main control valve will vary resulting in a displacement of the movable part of the servomotor. Since the structural part including the outlet aperture(s) or possibly the leadscrew is coupled to this movable part, the outlet aperture and the leadscrew will also perform a movement relative to each other and this in such a manner that the deviation between input and output signal is eliminated. The outlet aperture will thus follow the screw thread. In this manner, as it were, a hydraulic nut is obtained whereby the rotation of the leadscrew is automatically converted into a rectilinear movement of the follower system.

In order to maintain the resultant forces of the leadscrew small, a further embodiment includes a plurality of outlet apertures which can all be connected through a restriction to the source of liquid of constant pressure, the outlet apertures being distributed over the periphery of the leadscrew along a helix having the same pitch angle as the thread on the leadscrew in such a manner that the pressure forces exerted on the leadscrew substantially compensate one another.

If only one outlet aperture or one group of outlet apertures located on a helix around the leadscrew is provided, then the outlet aperture(s) will cooperate with the end face of the thread and the front flank of the thread or with the end face of the thread and the rear flank of the thread, dependent on the manner of feedback of the movement of the servomotor. Thus only one control pressure is obtained.

Under circumstances it is desirable to apply two control pressures to the main control valve, which control pressures must vary in an opposite sense in case of disturbance of the balance.

In order to achieve this, in a further embodiment of the arrangement according to the invention two outlet apertures or two groups of outlet apertures are provided which can all be connected through a restriction to the source of liquid of constant pressure, one outlet aperture or one group of outlet apertures cooperating with the end face of the thread and one thread flank, and the other outlet aperture or other groups of outlet apertures cooperating with the end face of the thread and the other thread flank, all outlet apertures being coupled in the same manner to the movable part of the servomotor. In this manner it is achieved that when one outlet aperture or one group of outlet apertures is opened to a greater extent the other outlet aperture or other groups of outlet apertures is closed to a greater extent. The resultant control pressures will thus also vary in an opposite sense.

In a further embodiment of the control arrangement the command device is formed by an electric stepping motor. This has the advantage that the electric motor can be ordered to perform a certain number of steps, which corresponds to a certain angular displacement of the leadscrew and dependent on the pitch of the thread a previously determined rectilinear movement of the moving part of the servomotor is directly obtained. In this case a measuring system for the feedback of input and output signal is superfluous.

In order that the invention may be readily carried into effect it will now be described in detail by way of example, with reference to the accompanying diagrammatic drawing, in which.

Figure 1:
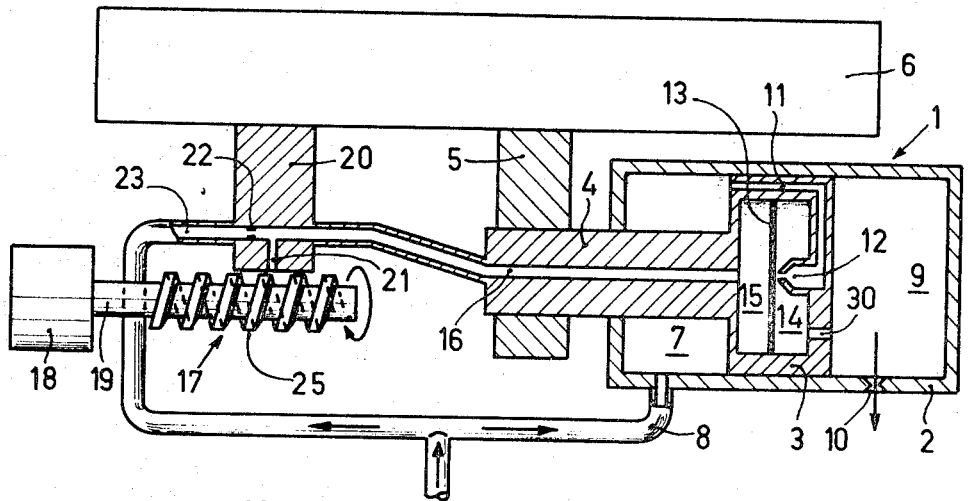
FIG. 1 shows a hydraulic servosystem which is provided with a precontrol arrangement, a main control valve and a servomotor which is coupled to a machine part to be moved.

The system of FIG. 1 includes a servomotor 1 which is formed by a cylinder 2 including a piston 3 adapted to reciprocate therein. The piston 3 is connected through a piston rod 4 and a structural part 5 to a controllable slide 6 of a machine tool. The space 7 on one side of piston 3 is connected through a conduit 8 to a pumping device not shown, a substantially constant liquid pressure $p_s$ always prevailing in the conduit 8. The space 9 on the other side of piston 3 communicates through a fixed restriction 10 with a space or conduit in which a substantially low constant pressure prevails. The spaces 7 and 9 communicate with each other through a conduit 11 accommodated in piston 3, a main control valve formed by an outlet aperture 12 and a diaphragm 13 as well as a space 14 and a communication aperture 30. The outflow resistance of aperture 12 is determined by the distance between diaphragm 13 and aperture 12. Thus the constant pressure $p_s$ always prevails in space 7 while the pressure $p_c$ in space 9 is dependent on the static and dynamic loads.

The space 15 on the side of diaphragm 13 remote from the outlet aperture 12 communicates through a duct 16 with a precontrol arrangement 17 which supplies a control pressure $p_p$ for the diaphragm 13.

The precontrol arrangement 17 consists of an electric stepping motor 18 which is coupled to a leadscrew 19. A structural part 20 which extends up to substantially the outer diameter of the leadscrew and which accommodates an outlet aperture 21 is connected to the slide 6. The outlet aperture 21 communicates through a restriction 22 with a flexible conduit 23 through which liquid of substantially constant pressure is supplied. Conduit 16 is connected to the duct section between restriction 22 and outlet aperture 21.

The operation of this arrangement is as follows.

Pressure liquid of substantially constant pressure is supplied to the ducts 8 and 23. The liquid supplied through duct 23 to precontrol arrangement 17 may flow away through restriction 22 and outlet aperture 21. The liquid pressure $p_p$ between restriction 22 and outlet aperture 21 is determined by the outflow resistance of aperture 21, and this is determined by the extent to which this outlet aperture 21 is closed by the end face of screw thread 25. The pressure $p_p$ will also prevail in space 15 and determine also the distance between diaphragm 13 and outlet aperture 12. In the balanced state (rest position) the pressure $p_p$ is so large that the distance between diaphragm 13 and outlet aperture 12 allows a flow of liquid from space 7 to space 9 which is exactly equal to the flow of liquid through restriction 10. The pressures and piston surfaces are then chosen to be such that the forces on the piston 3 are balanced. If electric motor 18 is ordered, for example, with the aid of numerical control to perform a certain number of steps in the direction indicated by an arrow, then this will result in the first instance in leadscrew 19 performing a certain angular displacement in said direction, so that the end face of the thread commences to close the outlet aperture 21 to a greater extent. As a result the pressure $p_p$ between restriction 22 and aperture 21 increases. This pressure will also occur in space 15 so that diaphragm 13 is pushed to the right and the outflow resistance of aperture 12 increases. As a result a difference between the incoming flow and the outgoing flow of liquid will arise so that the piston 3 starts to move to the right. Since the piston 3 is rigidly coupled to the slide 6, the slide will also move to the right. Furthermore, structural part 20 is connected to slide 6 so that this part also moves to the right. As a result the original extent of closure of outlet aperture 21 is restored and when this condition is reached the system comes to a standstill again. The structural part 20 and outlet aperture 21 will thus start to follow the screw thread 25 as a result of the feedback of the movement of piston 3 upon rotation of the leadscrew 19, so that the structural part 20 behaves as a nut. The rotating movement of the electric motor (command device) is thus automatically converted into a rectilinear movement without using a mechanical transmission. By the choice of the stepping value of the motor and the reduction between the rotation of the motor shaft and the leadscrew and the pitch of the screw thread the value of the displacement of the slide for each step is directly laid down. A measuring system which feeds back output signal and input signal is then not necessary. It will be evident that this provides important advantages for numerical control. Instead of an electric stepping motor it is sometimes alternatively possible to use a different command device which rotates the leadscrew.

Figure 2:
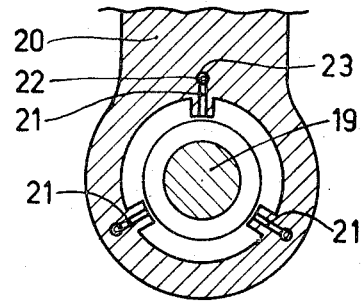
FIG. 2 shows a further embodiment of the precontrol arrangement of FIG. 1.

In the arrangement of FIG. 1 the precontrol arrangement is provided with one outlet aperture 21 only for the sake of clarity. In this case a given pressure is exerted on the end face of the screw thread by the liquid which pressure is to be absorbed by the leadscrew which may be undesirable under circumstances. To obviate this it is possible to distribute a plurality of outlet apertures 21 over the periphery of the leadscrew as shown in FIG. 2. These outlet apertures must then, however, be located on a helix which corresponds to the screw thread of the leadscrew. In this manner the radial forces exerted on the leadscrew by the liquid are compensated for.

In FIG. 1 the outlet aperture 21 cooperates with the end face and the right-hand flank of the screw thread. It is alternatively possible for the outlet aperture to cooperate with the end face and the left-hand flank, but then the feedback of the movement of piston 3 or the influence of control pressure $p_p$ must be adapted in such a manner that the outlet aperture still continues to follow the thread.

Figure 3:
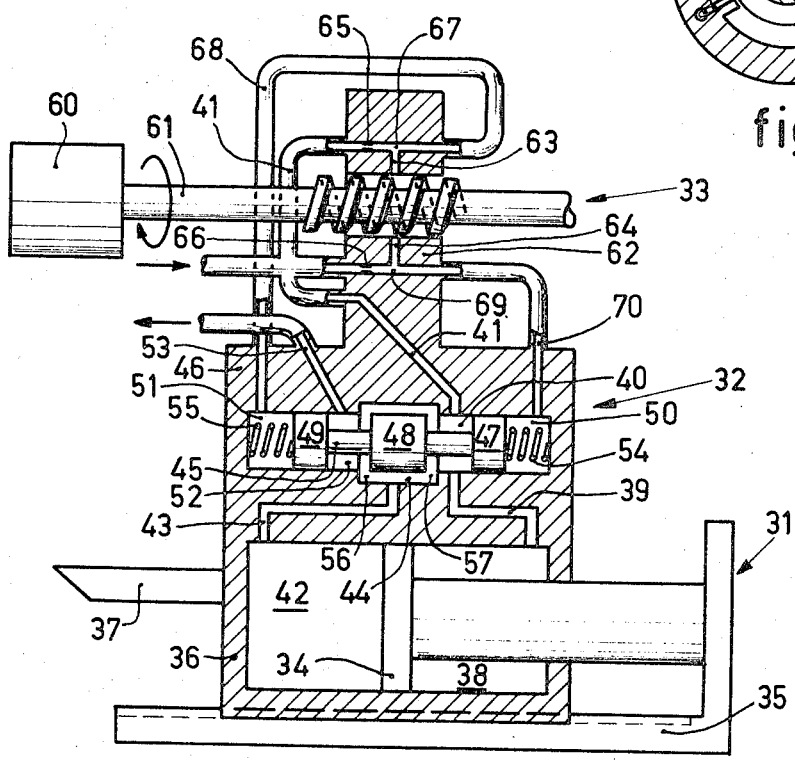
FIG. 3 shows a hydraulic servosystem in which the precontrol arrangement has as output signals two control pressures which vary in phase opposition.

FIG. 3 diagrammatically shows a servosystem having two stage control in which the precontrol arrangement supplies two control pressures $p1$ and $p2$ varying in phase opposition. This system comprises the servomotor section 31, a main control valve 32, and precontrol arrangement 33.

The servomotor section includes a piston 34 which is rigidly connected to the stationary part 35. This piston 34 is incorporated in a movable cylinder 36 which is connected to the machine part 37 to be controlled which is shown as a cutting tool for the sake of simplicity. The space 38 on the right-hand side of piston 34 communicates through duct 39 and space 40 with duct 41 containing high-pressure liquid of substantially constant pressure. The space 42 on the left-hand side of piston 34 is connected though a duct 43 to the space 44.

The main control valve 32 comprises a control slide 45 which is surrounded by a housing 46 which is integral with cylinder 36. The slide 45 comprises three pistonlike parts 47, 48, 49. A space 50 is bounded on the right-hand side by the pistonlike part 47, while a space 51 is bounded on the left-hand side by the pistonlike part 49. A space 52 which communicates through a duct 53 with a space (container) not shown of low substantially constant pressure is present between the parts 48 and 49. Springs 54 and 55 maintain the slide 45 in its central position. Upon displacing the slide 45 from its central position, the connections 56 and 57 between the space 44 and the spaces 52 and 40, respectively, are varied, so that the ratio between the supply of liquid to and the discharge of liquid from space 34 is influenced. As a result cylinder 36 will start to move.

The precontrol arrangement 33 again comprises a stepping motor 60 which is coupled to a leadscrew 61. A structural part 62 again surrounds the leadscrew and is rigidly coupled to cylinder part 46 and hence to cylinder 36. A plurality of outlet apertures is provided in this structural part, only two apertures of which are shown by the reference numerals 63 and 64 for the sake of simplicity. These outlet apertures communicate through restrictions 65 and 66, respectively, with the conduit 41 which contains high-pressure liquid of substantially constant pressure. The duct space 67 between outlet aperture 63 and restriction 65 is connected through conduit 68 to the space 51 in the main control slide, while the duct space 69 between outlet aperture 64 and restriction 66 is connected through conduit 70 to space 50 in the main control valve.

The remarkable fact in this case is that the outlet apertures 63 and 64 are shifted relative to each other in the longitudinal direction of the leadscrew in such a manner that the aperture 64 cooperates with the end face of this thread and the left-hand thread flank, while aperture 63 cooperates with the end face of the thread and the righ-hand thread flank. In general it can be stated that the aperture 63 or apertures 63 and the aperture 64 or the apertures 64 are located on two helixes corresponding to the screw thread on the leadscrew and the distance between these two helixes is approximately the thickness of the thread or approximately the thickness of the thread plus integral number of times multiplied by the pitch.

The result is that upon rotation of the lead screw 61 in the direction of the arrow the thread will close aperture 63 to a greater extent and will close aperture 64 to a lesser extent with the result that the pressure $p_1$ in space 67 will increase and the pressure $p_2$ in space 69 will decrease. Since these pressures are transferred through conduits 68 and 70 to the spaces 51 and 50, respectively, the balance of forces on slide 45 is disturbed and this slide will move to the right. This has the result that aperture 57 becomes smaller and aperture 56 becomes larger so that less liquid is applied to space 34 and more liquid is removed so that cylinder 36 moves to the right. Due to the feedback of this movement towards the precontrol arrangement the structural part 62 is also moved to the right. As a result outlet aperture 63 is again released to a further extent by the end face of the thread, while outlet aperture 64 is again closed to a further extent so that the original starting position is obtained again. The pressures $p_1$ and $p_2$ then again acquire their original values and also the slide 45 again occupies its original position relative to its housing. The system then comes to a standstill again. The structural part 62 (including everything connected thereto) then has exactly followed the thread just as does a mechanical nut.

It may be evident from the foregoing that the invention provides a surprisingly simple precontrol arrangement in which a rotation serving as an input signal is automatically converted into a rectilinear movement without a mechanical conversion arrangement with all drawbacks attended therewith being required.

We claim:

1. A control arrangement particularly suitable for use as a precontrol arrangement for a main control valve of a hydraulic servomotor having a fluid actuated movable part, comprising in combination:

a leadscrew having a thread presenting a crest in the form of a helical face bounded by flanks at either side thereof;

a structural part connected to said movable part for movement therewith, said structural part having an outlet aperture facing said helical face of the thread of said leadscrew and in close adjacency thereto;

duct means connected at one end to a source of fluid of substantially constant pressure, and connected at its opposite end to said main control valve for establishing fluid pressure thereat to control movement of said movable member of the servomotor, said outlet aperture communicating with said duct means between its ends, and said duct means and said outlet aperture whereby fluid pressure at said opposite end of the duct means is controlled by the rate of fluid flow through said outlet aperture;

said main control valve having a balanced state in which said outlet aperture is in predetermined position relative to said helical face of the leadscrew wherein the outlet aperture overlaps and is partially blocked by said helical face of the leadscrew; and means for rotating said leadscrew to alter said predetermined relative position between said outlet aperture and said helical face of the leadscrew.

2. The control arrangement as defined in claim 1 including a plurality of outlet apertures arranged symmetrically around said leadscrew, said outlet apertures being disposed along a helix having the same pitch angle as the thread of said leadscrew.

3. The control arrangement as defined in claim 1 including second duct means connected at one end to a source of fluid of substantially constant pressure, and connected at its opposite end to said main control valve for establishing a balancing fluid pressure thereat in opposition to that of the first duct means, said structural part having a second outlet aperture communicating with said second duct means, and said second duct means including fluid flow restrictive means between said one end of the second duct means and said second outlet aperture, said second outlet aperture being spaced from the first outlet aperture, such that in said balanced position of the main control valve, said first outlet aperture overlaps said helical face from the direction of one of said flanks while the second outlet aperture overlaps the helical face from the direction of the other flank.